US011707913B2

(12) United States Patent
Dressler et al.

(10) Patent No.: US 11,707,913 B2
(45) Date of Patent: Jul. 25, 2023

(54) SEMI-RIGID DISPLAY BOARD

(71) Applicant: The Gilman Brothers Company, Gilman, CT (US)

(72) Inventors: Donald R. Dressler, Glastonbury, CT (US); Evan Gilman, Gilman, CT (US); Cyrus Gilman, Gilman, CT (US); Vincent Postemski, Lebanon, CT (US)

(73) Assignee: The Gilman Brothers Company, Gilman, CT (US)

( * ) Notice: Subject to any disclaimer, the term of this patent is extended or adjusted under 35 U.S.C. 154(b) by 0 days.

(21) Appl. No.: 17/146,551

(22) Filed: Jan. 12, 2021

(65) Prior Publication Data

US 2021/0221095 A1     Jul. 22, 2021

Related U.S. Application Data

(60) Provisional application No. 62/962,544, filed on Jan. 17, 2020.

(51) Int. Cl.
*B32B 5/18*           (2006.01)
*B32B 7/12*           (2006.01)

(52) U.S. Cl.
CPC .................... *B32B 5/18* (2013.01); *B32B 7/12* (2013.01); *B32B 2250/03* (2013.01); *B32B 2250/40* (2013.01); *B32B 2266/0221* (2013.01); *B32B 2266/08* (2013.01); *B32B 2307/536* (2013.01); *B32B 2307/54* (2013.01)

(58) Field of Classification Search
CPC ......... B32B 5/18; B32B 7/12; B32B 2250/03; B32B 2250/40; B32B 2266/0221; B32B 2266/08; B32B 2307/536; B32B 2307/54
See application file for complete search history.

(56) References Cited

U.S. PATENT DOCUMENTS

| | | | |
|---|---|---|---|
| 5,695,870 A | 12/1997 | Kelch et al. | |
| 5,882,776 A | 3/1999 | Bambara et al. | |
| 6,531,520 B1 * | 3/2003 | Bambara | C08L 23/04 521/134 |
| 9,734,739 B2 * | 8/2017 | Winter | G09F 1/10 |
| 9,938,438 B2 * | 4/2018 | Dressler | C09J 131/04 |
| 2004/0096626 A1 * | 5/2004 | Azevedo | B32B 3/18 428/35.7 |
| 2006/0228539 A1 * | 10/2006 | Cheung | B32B 27/32 428/319.3 |
| 2007/0141546 A1 | 6/2007 | Kang et al. | |

(Continued)

OTHER PUBLICATIONS

EVA foam Technical Data Sheet from Jacobs and Thompson, 2018 (Year: 2018).*

(Continued)

*Primary Examiner* — Hai Vo

(74) *Attorney, Agent, or Firm* — Alix, Yale & Ristas, LLP

(57) ABSTRACT

A display board has a foam core with elastomeric properties with a first display layer affixed on one side and optionally a second display layer affixed on a second side. The elastic foam core can have a closed cell structure and be made from a thermoplastic. The display layers can be heat welded directly to the respective sides of the core with or without additional use of adhesive or the layers can be attached via adhesive only and not heat. The foam core has a Shore 00 hardness of 20-100.

12 Claims, 2 Drawing Sheets

(56) References Cited

U.S. PATENT DOCUMENTS

| | | | | |
|---|---|---|---|---|
| 2010/0124653 | A1* | 5/2010 | Tadros | B32B 27/065 |
| | | | | 156/60 |
| 2011/0146126 | A1* | 6/2011 | Phillips | A47G 1/14 |
| | | | | 156/212 |
| 2011/0206926 | A1* | 8/2011 | Marc | B32B 7/12 |
| | | | | 428/319.3 |
| 2012/0101179 | A1* | 4/2012 | Purcell | C08J 9/0061 |
| | | | | 521/134 |
| 2015/0299539 | A1* | 10/2015 | Dressler | B32B 37/06 |
| | | | | 156/320 |
| 2017/0291390 | A1 | 10/2017 | Daun et al. | |
| 2019/0000233 | A1* | 1/2019 | Holland | G09F 1/00 |
| 2019/0084341 | A1* | 3/2019 | Franco | B43L 1/00 |

OTHER PUBLICATIONS

"Blowing agent," Wikipedia, 2000, retrieved on Mar. 5, 2021 from <https://en.wikipedia.org/wiki/Blowing_agent>.
International Search Report and Written Opinion dated Apr. 1, 2021 for International Patent Application No. PCT/US2021/013014.

* cited by examiner

SEMI-RIGID DISPLAY BOARD

BACKGROUND

The disclosure relates to a display board for displaying graphics, photographs and/or text or similar visual material, and more particularly to a display board with a semi-rigid form, which is capable of bending, flexing and compressing with rebound properties similar to a cellular foamed elastomer.

Typically, mounting substrates used in graphics display applications for mounting a display layer (i.e., photographs, posters and signage) with an adhesive are formed of rigid materials such as wood, metal, solid plastic, high density foamed plastic, and composite foam boards. It is generally viewed as preferable to use a material that combines high rigidity and low mass to display something in a location such as hanging on a wall or free hanging in a retail store. To address the lightweight rigid requirement, foam boards have been developed with a hard foamed core of polystyrene or urethane that is laminated on both surfaces with hard rigid plastic sheets, papers or wood fiber veneers.

Such foam board products usually have a thickness within a range of approximately 0.125-1.5 inches and vary widely in dimensions up to as large as approximately 60×120 inches. A drawback of standard polystyrene or urethane foam board products is that they have little ability to bend or flex and are easily damaged by physical contact. The foam boards do not have compressibility or elastic properties and the rigidity is such that permanent dents or dimples can appear in the surface with application of a force, which understandably degrades the quality of the display.

In addition to mounting a surface display layer (paper, polymer, etc.) on a foam board surface, recent advancements in printing technology have allowed direct printing of graphics to the board surface without requiring an adhesive system or mounting of a separate printed substrate via a secondary operation. However, these advancements have not eliminated requirements to provide a display substrate with adhesive systems on the surface in order to mount a printed photo, poster or like to the surface of the rigid foam polystyrene or urethane board.

Known display board substrates carry benefits and drawbacks. For example, materials such as solid plastics are heavy and require special cutting tools like saws. Metals may require handling with special metal working equipment like a metal shear. Notably, the look of the exposed edges of the known display board core materials is critical for appearance in that typically the cut edge is the finished edge and will not be hidden in a frame. While it is possible to form an aesthetically acceptable edge with a variety of rigid, hard, thin solid substrates like acrylic, PVC, metal and aluminum composite panels via routing and similar finishing processes to the raw unfinished edges, this phenomenon centered on edge appearance is often a challenge for a variety of substrates.

Notwithstanding, it is widely appreciated that foam boards are the most universal, cost effective, lightest, and easy to fabricate, and thus popular in the graphics display field. Foam boards are lightweight; however, they have low durability in that the edges and corners chip easy, and the thin usually plastic laminate layer can bend and separate away from the foam core material. Foam boards additionally exhibit undesirable textural issues in that they are prone to mottle or unwanted texture with a mounted photograph or printed graphic. The cut unfinished edge of traditional foam board appears rough with visible foam core cell structure that lacks uniformity. The edge appearance of traditional black foam board carries its own drawbacks, including cell visibility, lack of uniformity and lack of a true black color due to the foaming process, all of which impact aesthetic appearance. The lightened appearance of the black color on the foam core is a major drawback on traditional foam boards. Further, edges of many traditional foamboards are rough and sharp when trimmed to size, which risks cutting the skin of any handler. Trimming or routing traditional foam boards generates a significant amount of dust and material particles, causing health risks, contamination of working space and contamination of mounting surface on the foam core itself prior to printing or mounting an outer display layer. Understandably, the operation of cleaning every side of every board is time consuming and costly.

Due to the rigid foam structure, surfaces of traditional foam boards can dent irreversibly. This causes surfaces with paper or plastic outer surfaces to show such dents where an acute pressure is applied, such as during handling or when a user presses the finished foam board display against a wall to hang it with a fastener or adhesive (i.e., pressure sensitive adhesive fastener or Command® strip). In areas in which pressure is applied, the cellular foam core will not rebound entirely, resulting in a permanent visible dent on the surface of the display board.

It would be useful to provide a foam board with a core that omits the above-noted drawbacks of traditional foam boards, but which carries the durability benefits of other types of display substrates. The inventors have developed a unique foam display board substrate with elasticity and other properties that omit the problems associated with traditional foam board substrates.

SUMMARY

In one embodiment, a display board comprises a flat foam core substrate and one or more outer display layers. The foam core substrate has elastomeric properties. The first outer layer is adhered to a first side of the elastomeric foam core substrate. The second outer layer, if present, is adhered to the second side of the elastomeric core substrate.

In another embodiment, a display board comprises a core substrate and a first outer sheet layer. The core is formed from an elastomeric foam and has a first side and an opposite second side. The first outer sheet layer is adhered to the first side of the core substrate. The elastomeric foam core substrate is formed from one or more material selected from the group consisting of EVA, nylon, polyethylene, EMA and urethane with closed cells having diameters within an approximate range of 0.1-0.5 mm and has a durometer hardness within an approximate range of 20-100 measured on the Shore 00 scale.

In some embodiments, the one or more outer layers are adhered to the core substrate directly.

In other embodiments, the outer layer or layers are adhered with use of an adhesive with or without additional heat.

In one embodiment, the core substrate is a thermoplastic, and the outer layer or layers are adhered with an adhesive comprising the same thermoplastic.

Some embodiments of the display board are formed from a core comprising ethylene-vinyl acetate.

DETAILED DESCRIPTION

Figure 1:
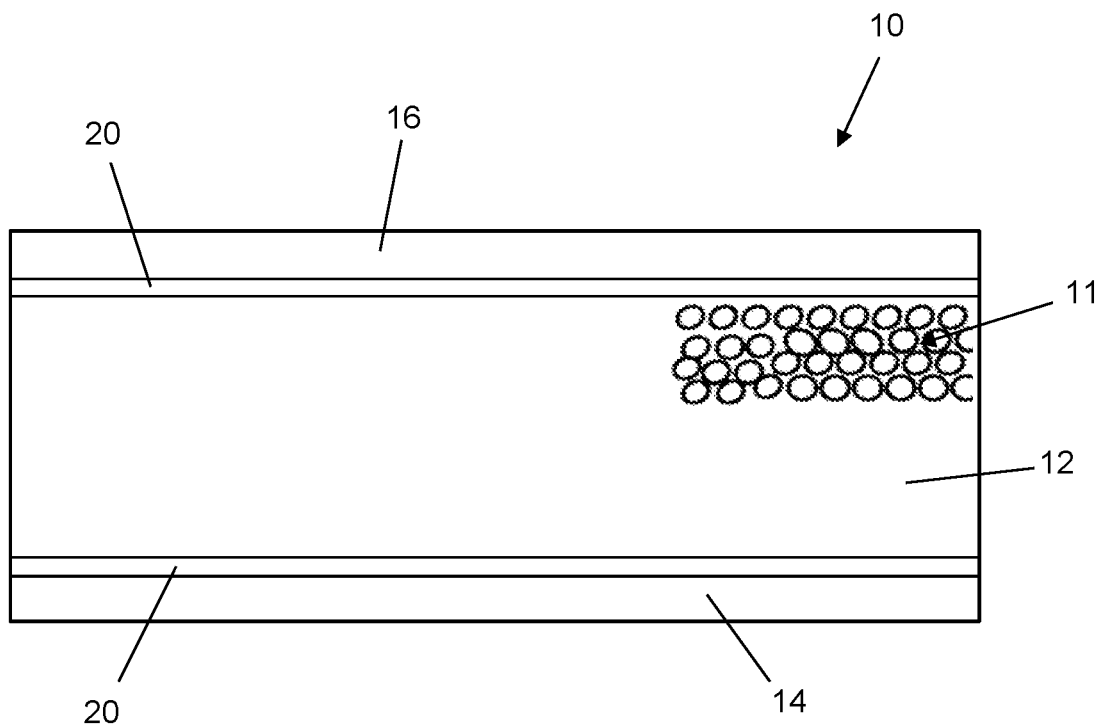
FIG. 1 shows an exemplary display board according to the disclosure formed by adhesive bonding of an outer layer to the foam core, with or without heat.

Among the benefits and improvements disclosed herein, other objects and advantages of the disclosed embodiments will become apparent from the following wherein like numerals represent like parts throughout the several figures. Detailed embodiments of a semi-rigid display board are disclosed; however, it is to be understood that the disclosed embodiments are merely illustrative of the invention that may be embodied in various forms. In addition, each of the examples given in connection with the various embodiments of the invention which are intended to be illustrative, and not restrictive.

Throughout the specification and claims, the following terms take the meanings explicitly associated herein, unless the context clearly dictates otherwise. The phrase "in some embodiments" as used herein does not necessarily refer to the same embodiment(s), though it may. The phrases "in another embodiment" and "in some other embodiments" as used herein do not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described unless the context clearly dictates otherwise. In addition, throughout the specification, the meaning of "a," "an," and "the" include plural references. The meaning of "in" includes "in" and "on".

Further, the terms "substantial," "substantially," "similar," "similarly," "analogous," "analogously," "approximate," "approximately," and any combination thereof mean that differences between compared features or characteristics is less than 25% of the respective values/magnitudes in which the compared features or characteristics are measured and/or defined.

Disclosed herein is a lightweight and soft foam board with a compressible core having elastic properties and thin laminate display surfaces, which may be one or more of a variety of materials. The disclosed board 10 is rigid enough in a thickness of as low as 0.125 inches to be self-supporting and flat in an upright position when used like traditional foam display boards (i.e., hung on a wall or from a ceiling via standard retail display systems and hardware). The foam board generally includes a foam core substrate 12 with one or more outer layers, 14 and 16, adhered to the surfaces of the core.

The cellular structure of the foam core 12 carries properties allowing the board 10 to be handled freely and, in some cases, roughly without showing damage from impact (surface dents, chipping, etc.) or scraping as compared to a traditional foam board (usually styrene- or urethane-based). As compared to known foam boards, the film outer laminate layers, 14 and 16, on one or both sides of the board 10 have shown a particular affinity to the foam core 12 such that the bonding strength is enhanced substantially as compared to that of traditional foam boards. This enhanced bond yields a durable board 10 that is resistant to damage due to a combination of the elastic properties of the soft core 12 and the enhanced adhesion of the laminate layers, 14 and 16, that resists separation. For example, striking an edge or corner of the disclosed board 10 results in no visible damage whatsoever like with traditional foam board products, which stands in stark contrast to traditional foam boards.

It is worth noting that some existing foam board products have high density rigid cores and laminates as thick as 30 mils on both sides of the core in order to strengthen the product and minimize chipping. Understandably, this solution yields a very heavy product and adds cost to the board. Additionally, the resulting board is still more susceptible to physical damage as compared to the inventive board 10 with elastic properties.

Additionally, routing and/or cutting with a hand razor knife or other traditional foam board cutting tools is an easier process with the disclosed board 10 compared to known foam boards in that cutting the inventive elastomeric boards does not generate dust or particles. The durability characteristics imparted by the elastic foam core 12 allow the board 10 to be fabricated in manners that are not possible with traditional foam boards. For example, the board 10 can include a decorative bevel cut around the perimeter of a board without risking damage like with a traditional foam board due to the rebounding properties of the core material.

Commonly, display graphics on the surfaces of many foam display boards are digitally printed with UV ink jet flatbed printers. With such printing techniques, the distance between the print head and the surface of the print board surface is critical for print quality and must be very close (typically 0.030-0.060 inches). Known foam boards commonly have somewhat inconsistent surfaces, which can cause issues when placed on a precision platen of the ink jet press during the printing process. A vacuum is used for holding down the foam board, but given the board's rigidity, if the surface is not completely flat, it oftentimes is not properly held down by the vacuum, which may result in a print head strike to the high point on the board surface. This is a common and serious concern for all manufacturers of foam boards.

As noted herein, the inventive board 10 with elastic foam core 12 retains a level of flexibility, which allows it to cooperate much more effectively with the vacuum pull and be maintained flat in the desired location relative to the print heads to avoid contact and resulting damage.

Understandably, when mounting a photo or other graphic printed materials to a foamboard or any other substrate the finished appearance of the piece is also critical. A smooth, glass-like finish is almost always preferred, but rarely achieved with known foam boards due to the inherent surface texture of the outer layers. An objective with any mounting substrate is to avoid adding any additional texture or mottle to the display surface. When photographs on photographic paper are mounted to traditional foam boards, the resulting display will show more texture and mottle than the original unmounted item. This additional texture is caused in large part by the uneven plastic foam core having extrusion and cell expansion mottle. This mottle transfers through the thin plastic or paper laminates on both sides of the foam core.

In contrast, the surfaces of the board 10 with soft elastic foam core 12 is much smoother than known foam boards due to a combination of the softness of the foam and the smaller cell structure of the foam. In fact, the smooth display surface exhibited by the disclosed board 10 is comparable to that of known smooth layer substrates, such as thick plastics, metal and glass.

Also, it is common to mount display boards on a wall, window or other surface via a pressure sensitive strip or tab with adhesive on the attachment side. Standard foam boards can be susceptible to bowing of the board materials caused by increases in temperature (plastic expansion) and/or moisture (paper expansion). When boards are attached to walls with a strip of pressure sensitive adhesive (PSA), such bowing may be substantial enough to cause the board lose connection with the strip of adhesive and break away from the wall. The disclosed foam boards 10 with elastic foam core 12 are resistant to such detachment, as the natural flexibility of the elastic foam allows the boards to overcome stresses caused by these changes in environmental conditions. Additionally, a substantially improved strength of adhesion between each outer layer, 14 and 16, to the core 12 has been observed.

Preferred embodiments of the board 10 include a foam core substrate 12 formed of ethylene-vinyl acetate (EVA), nylon, polyethylene, EMA or urethane. In a particularly preferred embodiment, the core substrate 12 is formed from a closed cell cross-linked EVA that exhibits compressibility and elastic properties. The foam core used within the inventive board 10 preferably has a durometer hardness within an approximate range of 20-100 (measured on the Shore 00 scale), more preferably within an approximate range of 40-80 (Shore 00), more preferably within an approximate range of 50-70 (Shore 00), even more preferably within an approximate range of 55-65 (Shore 00), and even more preferably approximately 60 (Shore 00). For example, an exemplary board 10 which was manufactured, and which forms the basis of some comparative discussion herein was formed of a cross-linked EVA foam core having a durometer hardness of approximately 57 (Shore 00).

Preferably, the foam core 12 has a cell size (diameter) of between approximately 0.1-0.5 mm, and more preferably between approximately 0.2-0.4 mm, and even more preferably approximately 0.3 mm.

Additionally, in a preferred embodiment of the display board 10, the core 12 is formed from an elastic foam having an apparent density within an approximate range of 30-60 kg/m$^3$, more preferably within an approximate range of 40-50 kg/m$^3$, and even more preferably approximately 45 kg/m$^3$ (BS EN ISO 7214:2012 test standard).

The preferred embodiment additionally includes a core made from an elastic foam with a tensile strength value within an approximate range of 550-850 kPA, more preferably within an approximate range of 600-800 kPA, more preferably within an approximate range of 650-750 kPA, and even more preferably approximately 700 kPA (BS EN ISO 7214:2012 test standard). In a particularly preferred embodiment, the core has a tensile strength value of approximately 704 kPA.

In the preferred embodiment, the core is made from an elastic foam that has a tensile elongation value within an approximate range of 100-200%, more preferably within an approximate range of 125-175%, more preferably within an approximate range of 135-165%, more preferably within an approximate range of 145-155%, and even more preferably approximately 150% (BS EN ISO 7214:2012 test standard). A particularly preferred embodiment of the display board has a core with a tensile elongation value of 148%.

As noted above, a particularly preferred embodiment includes a core formed from a closed cell cross-linked EVA material. Exemplary properties for a non-limiting preferred embodiment of cross-linked EVA foam core 12 for use in the board 10 are shown in Table 1:

TABLE 1

| Property | Value | Test standard |
|---|---|---|
| Apparent density | 45 kg/m3 | BS EN ISO 7214:2012 |
| Cell size | 0.3 mm | — |
| Compression stress-strain[1] | 71 (25% compression) 144 (50% compression) | BS EN ISO 7214:2012 |
| Tensile strength | 704 kPa | BS EN ISO 7214:2012 |
| Tensile Elongation | 148% | BS EN ISO 7214:2012 |
| Compression set[2] | 14% set (0.5 hr. recovery) 4% set (24 hr. recovery) | BS EN ISO 7214:2012 |

FIG. 1 shows a graphical depiction of an embodiment of the board 10, comprising an elastic foam core 12 with outer layers 14 and 16 affixed to the foam core 12 via an intermediate layer of adhesive 20. In some embodiments, the adhesive bond can be initiated or enhanced via application of heat. Additionally, the adhesive may be a thermoplastic.

Figure 2:
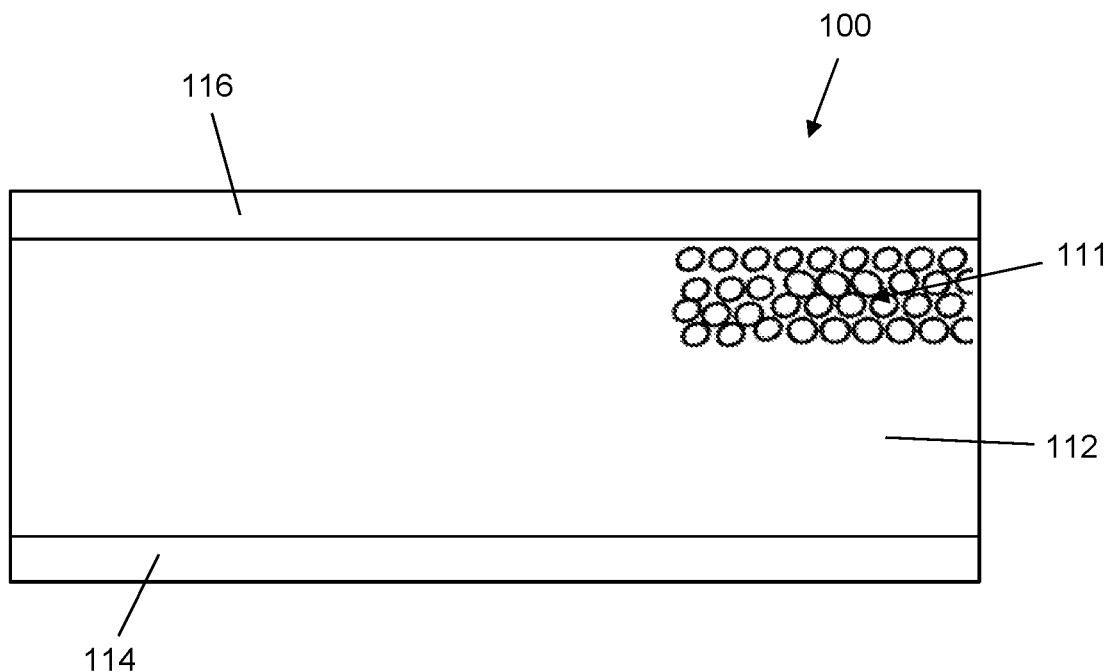
FIG. 2 shows another embodiment of the display board according to the disclosure formed by heat welding an outer layer directly to the foam core.

FIG. 2 depicts a closely related embodiment of the semi-flexible display board 100 having first and second outer layers, 114 and 116, adhered directly to an elastic foam core 112 via heat welding or similar technique to fuse the outer layers to the elastomeric core material. As noted above, in a preferred embodiment, the core substrate 12/112 is formed from a closed cell elastic or elastomeric foam material. Closed cells are generally represented in FIGS. 1 and 2 and identified by reference numerals 11 and 111, respectively. The core substrate layer can vary in thickness for different uses. For example, the core can have a thickness within an approximate range of 0.125-1.5 inches. The disclosed As noted herein, the outer layers 14/114 and 16/116 may be any known material as used in the display board arts, including paper or plastic materials, for example acrylic, polyester, PVC, polystyrene, polypropylene, wood fiber saturated veneers, paper, woven or non-woven fabrics and woven or non-woven synthetics. The core layer 12/112 is formed from one or more materials selected ethylene-vinyl acetate (EVA), nylon, polyethylene, EMA or urethane.

Figure 3:
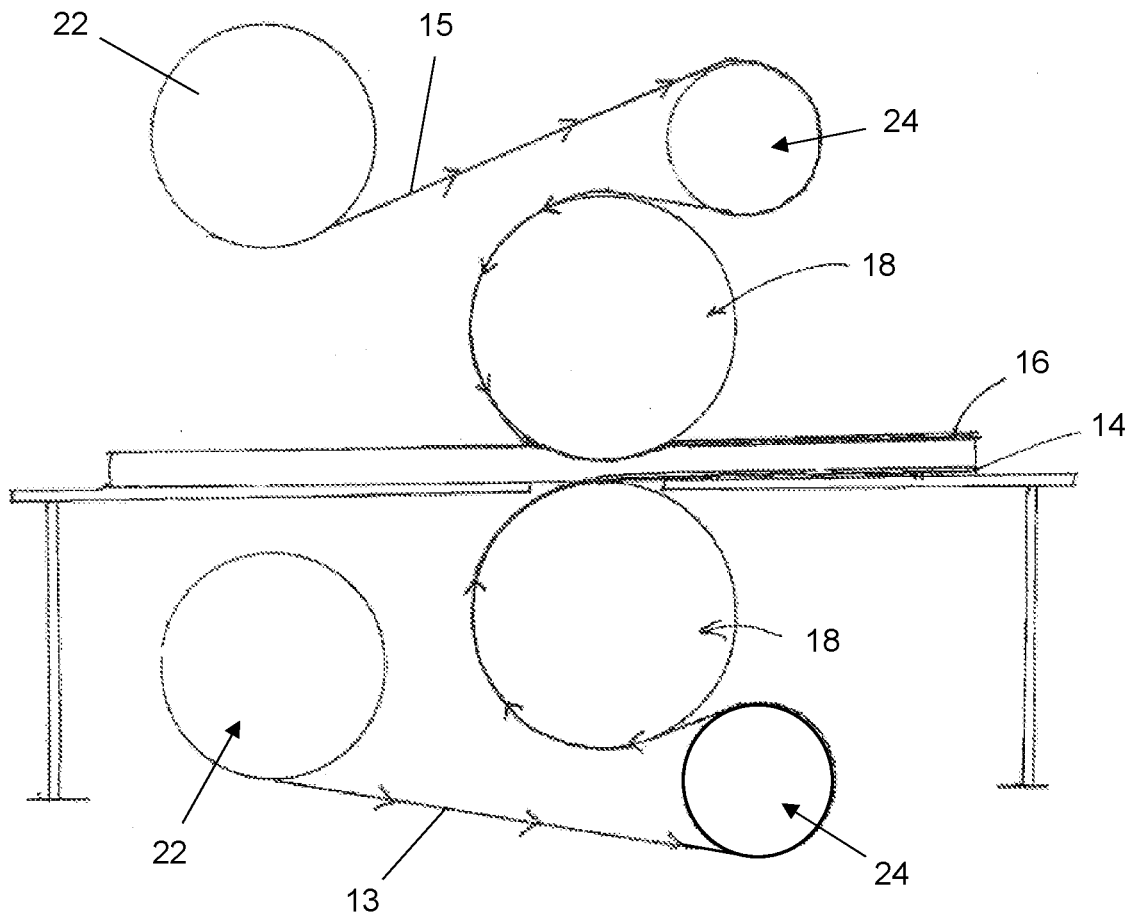
FIG. 3 shows a system for performing a process for forming the inventive display board via hot roll lamination.

FIG. 3 shows a preferred system for performing a heat welding manufacturing process for forming the disclosed foam board 10. As shown, the raw film material, 13 and 15, that forms the outer layers, 14 and 16, of the display board is fed from a respective unwinding spool 22 through heated rollers 18 on opposite sides of the foam core substrate 12, which runs along a flat surface such as a table. This process and instrumentation results in a strong bonded attachment between the outer layers, 14 and 16, and the core substrate 12. As is known in the art and shown in FIG. 3, an idler roll 24 may be positioned intermediate a respective unwinding spool 22 and heated roller 18. As noted above, in some embodiments, the outer film layers 14 and 16 are heat welded with a layer of adhesive 20 between a side of the core 12 and the respective film layer. Of course, embodiments of the display board 10 exist with only one outer film layer. Thus, the assembly may include a single unwinding spool 22/idler roll 24/heated roll 18 sub-assembly rather than the pair of parallel sub-assemblies shown in FIG. 3.

Additional techniques for forming the display board 10 comprising a first outer sheet layer 14 and/or the second outer sheet layer 16 are via extrusion or cast processes.

The film outer layers, 14 and 16, can be made from a variety of different materials. For example, the outer layers, 14 and 16, can be independently selected from acrylic, polyester, PVC, polystyrene, polypropylene, wood fiber saturated veneers, paper, and woven and non-woven fabrics and synthetics, including cotton. A particularly preferred material for one or both of the outer layers is a high impact polystyrene resin. Preferably, the film outer layers have thicknesses within an approximate range of 0.001-0.065 inches, and more preferably within an approximate range of 0.003-0.020 inches.

In a particularly preferred embodiment, the outer film layers, 14 and 16, are heat welded to a foam core substrate 12 made from EVA foam with use of an EVA-based adhesive. The EVA adhesive has shown a surprisingly strong affinity for the EVA foam substrate 12 as compared to known foam core materials, such as styrene. Thus, the EVA foam substrate 12 provides a significantly greater level of adhesion to the film layers, 14 and 16, in the board 10.

Unlike traditional foam boards, the disclosed foam board 10 with elastic foam core 12 does not dent from acute compression during normal use due to the rebound properties of the core 12. Additionally, an exemplary foam board 10 with core 12 made from a closed cell cross-linked EVA with properties shown in Table 1 was tested and found to be approximately 30-50% lighter than traditional foam boards ("control") having the same dimensions and surface layers (control board formed from polystyrene crystal foam core with plastic saturated wood fiber facers on both sides of the foam and a liquid urethane laminating adhesive bonding the facer sheets to the foam core).

The embodiments discussed herein have included display layers, 14 and 16, however the inventive board 10 is not limited as such. For example, embodiments of the board 10 exist that include an adhesive system on one or both of the outer surfaces in place of a respective decorative display or signage layer. The adhesive system may be pressure sensitive (PSA), non-PSA, or heat activated. These adhesive systems may include a release liner cover to protect the surfaces until being removed to expose the adhesive for attachment to a surface or object. Further, the adhesive surface may have an air release mechanism built into the adhesive to assist with eliminating trapped air bubbles during mounting an item onto the adhesive surface.

In a preferred embodiment, the foam core substrate is formed by first providing a curable liquid material, usually thermoplastic or similar, and blowing a gas through the liquid thermoplastic material to impregnate the material while allowing or initiating curing of the material. In one embodiment, the gas is blown in an environment of elevated temperature and/or elevated temperature, to drive curing of the material, followed by a step of depressurization. A substantially flat foam core substrate with elastic properties is formed. Thereafter the first film layer and/or second film layer is affixed to the first or second sides of the foam core substrate in accordance with the above-described processes. In a particularly preferred embodiment, the gas is nitrogen, and the curable material is EVA which cures via cross-linking at elevated temperature and pressure.

For completeness, embodiments of the board 10 exist with both layers, 14 and 16, being non-adhesive layers optionally with display graphics or plain; one layer 14 being a non-adhesive layer and one layer 16 being an adhesive layer; and both layers, 14 and 16, being an adhesive layer. Further embodiments exist with only one outer film layer 14 (omitting a second outer layer 16).

Regardless of the identity of the specific outer layers, 14 and 16, the board 10 with elastic foam core 12 is a dramatic advancement over known display boards in that it combines the following features into a single product:

Highly durable
Light weight (even lighter than existing rigid foam boards)
Rebounds from pressure dents
Easy to print directly on the surfaces
Easy to handle and cut without generating dust byproduct
Stronger bond between outer layers and core, thereby preventing peeling
Denser color on edges compared to existing foam boards
Allow for smoother surface display than existing foam boards which inherently show texture
Temperature and moisture fluctuations do not impact the stability of the board and the integrity of the bond of the items to the PSA on the board As used herein, the term "elastomer" means any material exhibiting elastic or elastomeric properties. "Elastic" and "elastomeric" are used in a broad sense as known in the relevant art and generally mean able to deform under pressure, stretch or bend and return to an initial shape after the deforming force, stretching force or bending force is removed.

While a preferred embodiment has been set forth for purposes of illustration, the foregoing description should not be deemed a limitation of the invention herein. Accordingly, various modifications, adaptations and alternatives may occur to one skilled in the art without departing from the spirit of the invention and scope of the claimed coverage.

What is claimed is:

1. A semi-rigid flat display board comprising:
   a flat relatively soft elastomeric foam core substrate defining a first side and an opposite second side;
   a first outer film layer laminated to and in direct contact with the first side of the elastomeric foam core substrate and a second outer film layer laminated to and in direct contact with the second side of the elastomeric foam layer, wherein
   the first and second outer film layers are not adhesive layers;
   each of the first and second outer film layers is selected from the group consisting of acrylic, polyester, polyvinylchloride, polystyrene, and polypropylene;
   the outer and inner film layers intimately confine the core substrate, thereby producing a relatively harder semi-rigid display board characterized by compression and tension rebound;
   the foam core substrate is a closed cell cross-linked EVA foam with the closed cells having diameters within an approximate range of 0.1-0.5 mm, a durometer hardness within an approximate range of 20-100 measured on the Shore 00 scale, a tensile strength value within an approximate range of 550-850 kPA, and a tensile elongation value within an approximate range of 100-200%,
   the semi-rigid display board is self-supporting and inherently remains flat when configured in a free-standing upright position,
   the first outer film layer has a finished appearance without a textured and mottled appearance, and
   the first outer film layer has a smooth, flat, exposed surface with a flat display graphic printed or mounted thereon.

2. The display board of claim 1, wherein the foam core substrate is formed via blowing nitrogen gas through a liquid form of EVA material, and allowing the cross-linked EVA material to harden to form a foam.

3. The display board of claim 1, further comprising a pressure-sensitive adhesive (PSA) on one or both of the first outer layer and second outer layer, wherein the PSA further comprises an air release mechanism configured to assist in eliminating air bubbles during mounting an item onto the PSA.

4. The semi-rigid display board of claim 1, wherein each of the first and second outer film layers has a thickness within an approximate range of 0.003-0.020 inches.

5. The semi-rigid display board of claim 1, wherein the foam core substrate has a tensile elongation value within an approximate range of 125-175%.

6. The semi-rigid display board of claim 1, wherein the foam core substrate has a durometer hardness within an approximate range of 30-60 measured on the Shore 00 scale.

7. The semi-rigid display board of claim 1, wherein the compression and tension rebound are such that a dent caused by pressure applied to the first film layer or second film layer rebounds the respective first film layer or second film layer to substantially the same flatness as prior to the pressure being applied.

8. In a graphic display installation, a semi-rigid flat display board, comprising:
　a flat relatively soft elastomeric foam core substrate defining a first side and an opposite second side formed from one or more from the group consisting of EVA, nylon, polyethylene, EMA or urethane;
　a first outer film layer laminated to and in direct contact with the first side of the elastomeric foam core substrate and a second outer film layer laminated to and in direct contact with the second side of the elastomeric foam layer, the first and second outer film layers intimately confining the core substrate, thereby producing a relatively harder semi-rigid display board characterized by compression and tension rebound;
　a flat display graphic printed or mounted on the first outer film layer, wherein
　the first and second outer film layers are not adhesive layers;
　each of the first and second outer film layers is selected from the group consisting of acrylic, polyester, polyvinylchloride, polystyrene, and polypropylene;
　the foam core substrate is a closed cell cross-linked foam with the closed cells having diameters within an approximate range of 0.1-0.5 mm, a durometer hardness within an approximate range of 20-100 measured on the Shore 00 scale, a tensile strength value within an approximate range of 550-850 kPA, and a tensile elongation value within an approximate range of 100-200%,
　the semi-rigid display board is self-supporting and inherently remains flat when configured in an upright position, and
　the first outer film layer has a finished appearance without a textured and mottled appearance,
　the display board is mounted on a surface or hung from a structure in the upright position with the display graphic exposed.

9. The semi-rigid display board of claim 8, further comprising a pressure-sensitive adhesive on the second outer film layer.

10. The semi-rigid display board of claim 8, wherein the flat display graphic is mounted on the first outer film layer with a pressure-sensitive adhesive.

11. The semi-rigid display board of claim 8, wherein each of the first and second outer film layers has a thickness within an approximate range of 0.003-0.020 inches.

12. A semi-rigid flat display board, consisting essentially of:
　a flat relatively soft elastomeric foam core substrate defining a first side and an opposite second side;
　a first outer film layer laminated to and in direct contact with the first side of the elastomeric foam core substrate and a second outer film layer laminated to and in direct contact with the second side of the elastomeric foam layer, wherein
　the first and second outer film layers are not adhesive layers;
　each of the first and second outer film layers is selected from the group consisting of acrylic, polyester, polyvinylchloride, polystyrene, and polypropylene;
　the outer and inner film layers intimately confine the core substrate, thereby producing a relatively semi-rigid display board characterized by compression and tension rebound;
　the foam core substrate is a closed cell cross-linked EVA foam with closed cells having diameters within an approximate range of 0.1-0.5 mm, a durometer hardness within an approximate range of 20-100 measured on the Shore 00 scale, a tensile strength value within an approximate range of 550-850 kPA, and a tensile elongation value within an approximate range of 100-200%,
　the semi-rigid display board is self-supporting and inherently remains flat when configured in an upright position,
　the first outer film layer has a finished appearance without a textured and mottled appearance, and
　the first outer layer has a smooth, flat, exposed surface with a flat display graphic printed or mounted thereon.

* * * * *